(12) United States Patent  
Johnson

(10) Patent No.: US 9,936,123 B2  
(45) Date of Patent: Apr. 3, 2018

(54) CAMERA AND METHOD WITH WIDESCREEN IMAGE ON NEARLY-SQUARE ASPECT RATIO PHOTOSENSOR ARRAY

(71) Applicant: OmniVision Technologies, Inc., Santa Clara, CA (US)

(72) Inventor: Kevin Johnson, Mundelein, IL (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/229,040

(22) Filed: Aug. 4, 2016

(65) Prior Publication Data

US 2018/0041688 A1   Feb. 8, 2018

(51) Int. Cl.
| | |
|---|---|
| H04N 5/232 | (2006.01) |
| G02B 7/38 | (2006.01) |
| G02B 13/08 | (2006.01) |
| G02B 27/00 | (2006.01) |
| H04N 5/225 | (2006.01) |
| H04N 9/04 | (2006.01) |
| H04N 9/07 | (2006.01) |

(52) U.S. Cl.
CPC .......... *H04N 5/23212* (2013.01); *G02B 7/38* (2013.01); *G02B 13/08* (2013.01); *G02B 27/0025* (2013.01); *H04N 5/2254* (2013.01); *H04N 9/045* (2013.01); *H04N 9/07* (2013.01)

(58) Field of Classification Search
CPC .. H04N 5/23212; H04N 9/045; H04N 5/2254; H04N 9/07; G02B 27/0025; G02B 7/38; G02B 13/08

See application file for complete search history.

(56) References Cited

U.S. PATENT DOCUMENTS

| | | | | |
|---|---|---|---|---|
| 5,184,223 A | * | 2/1993 | Mihara | G02B 13/08 348/207.99 |
| 2006/0045504 A1 | * | 3/2006 | Zarnowski | G02B 7/028 396/79 |
| 2010/0079628 A1 | * | 4/2010 | Oda | H04N 5/367 348/243 |
| 2013/0308026 A1 | * | 11/2013 | Black | H04N 5/2254 348/302 |

\* cited by examiner

*Primary Examiner* — Timothy J Henn  
(74) *Attorney, Agent, or Firm* — Lathrop Gage LLP

(57) ABSTRACT

A digital widescreen camera has an anamorphic lens focusing a field of view nearly twice as wide as tall on a photosensor array having nearly square aspect ratio. In embodiments, the photosensor array has an 8-pixel tiling unit organized as four pairs of adjacent left and right pixels, a first pair having two red-responsive pixels, a second pair having two blue-responsive pixels, and a third pair having two green-responsive pixels. In embodiments, signals from the 8-pixel tiling unit are processed into signals equivalent to signals from two adjacent Bayer-pattern 4-pixel tiling units. The corresponding method of digital photography includes receiving light through an anamorphic lens onto a photosensor array. In embodiments, the photosensor array has an eight-pixel tiling with four pairs of adjacent left and right pixels, a first pair with two red-responsive pixels, a second pair with two blue-responsive pixels, and a third pair with two green-responsive pixels.

10 Claims, 2 Drawing Sheets

CAMERA AND METHOD WITH WIDESCREEN IMAGE ON NEARLY-SQUARE ASPECT RATIO PHOTOSENSOR ARRAY

FIELD

The invention relates to the field of widescreen cameras implemented with traditional photosensors using an anamorphic lens and a digital image processor.

BACKGROUND

Anamorphic lenses have been used in the motion picture industry since the 1953 introduction of Cinemascope. These lenses have the interesting property of focusing light from a scene as an image on a film with a first magnification in a vertical axis of the film, and a second magnification in a horizontal axis. Each image captured with such a lens appears distorted on the film, shrunken in the horizontal axis, but if projected onto a screen through a similar lens this distortion is removed as projected light forms an undistorted widescreen image on the screen.

Anamorphic lenses have not been commonly used with digital photography.

SUMMARY

A digital widescreen camera has an anamorphic lens focusing a field of view nearly twice as wide as tall on a photosensor array having nearly square aspect ratio. In embodiments, the photosensor array has an 8-pixel tiling unit organized as four pairs of adjacent left and right pixels, a first pair having two red-responsive pixels, a second pair having two blue-responsive pixels, and a third pair having two green-responsive pixels. In embodiments, signals from the 8-pixel tiling unit are processed into signals equivalent to signals from two adjacent Bayer-pattern 4-pixel tiling units.

A method of digital photography includes receiving light through an anamorphic lens onto a photosensor array. In embodiments, the photosensor array has an eight-pixel tiling with four pairs of adjacent left and right pixels, a first pair with two red-responsive pixels, a second pair with two blue-responsive pixels, and a third pair with two green-responsive pixels.

DETAILED DESCRIPTION OF THE EMBODIMENTS

Figure 1:
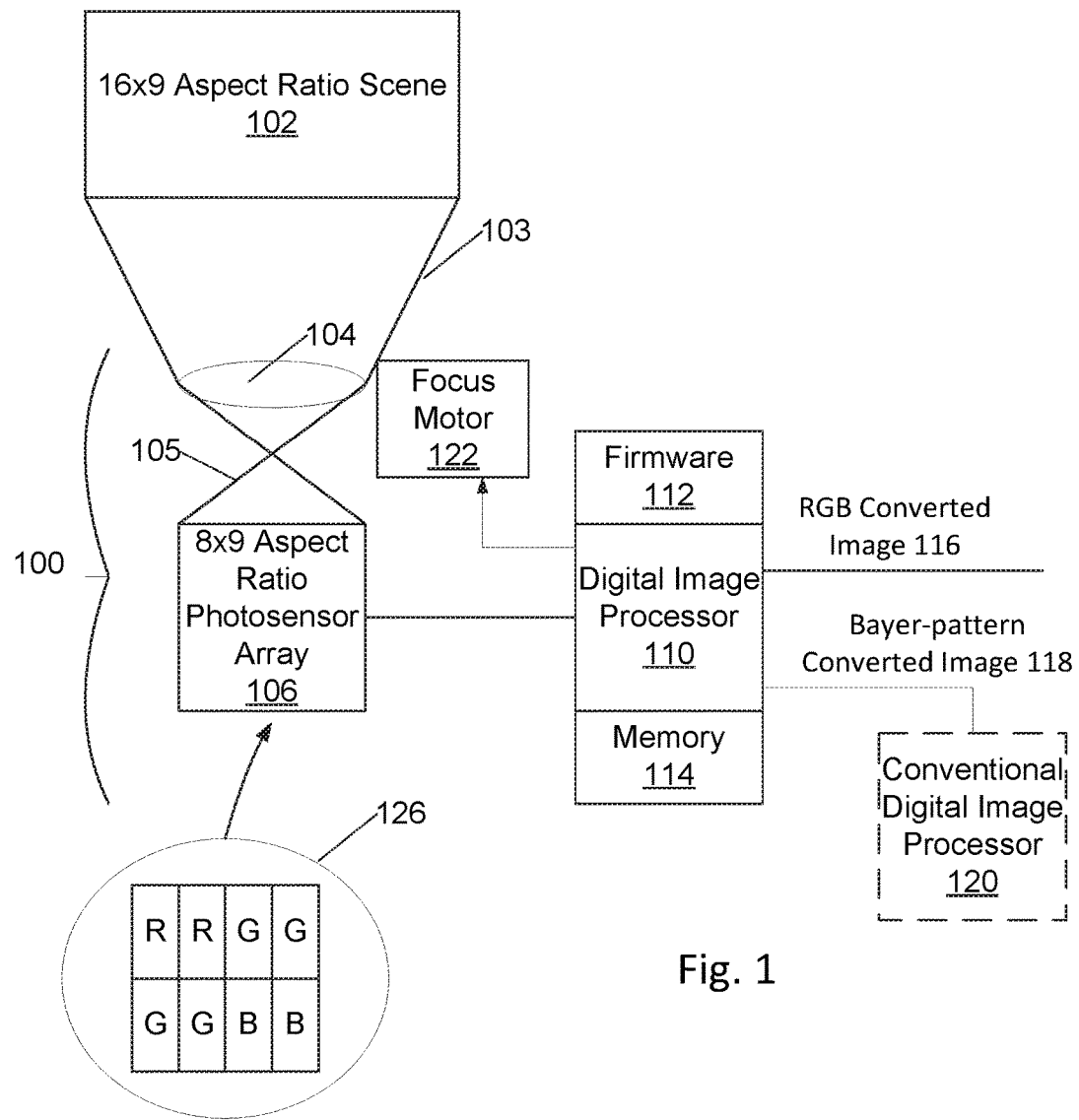
FIG. 1 is a schematic block diagram of a camera system.

A camera system 100, designed to capture an image of a scene 102 with the 16:9 widescreen aspect ratio popular in HD television systems, captures light 103 from scene 102 through anamorphic lens 104 and focuses this light as light 105 onto a photosensor array 106 that has an aspect ratio that is more nearly square than scene 102. In a particular embodiment, photosensor array has aspect ratio of 8×9 although with alternative anamorphic lenses 104 aspect ratios from 1.2×1 to 0.8:1 may be used; in these embodiments the photosensor array is roughly square while the field of view of the scene is roughly twice as wide as it is tall, as has become standard for 16:9 aspect ratio widescreen video.

Photosensor array 106 is coupled to provide raw images to a digital image processor 110, image processor 110 is adapted for color processing and autofocus operations by firmware 112 while operating on temporary copies of at least portions of images held briefly in memory 114. Image processor 110 provides focus control information to an autofocus motor 122 that is coupled to adjust focus of anamorphic lens 104.

In an RGB embodiment, digital image processor 110 provides R, G, and B outputs as a color-resolved RGB image output 116, the RGB image output is provided with a pixel output organized in 16:9 widescreen format. In an alternative embodiment adapted for compatibility with camera systems and image processing systems 120 designed for use with traditional Bayer-pattern photosensor arrays, digital image processor 110 provides an pixel data stream output 118 adapted into a traditional Bayer pattern format and organized in 16:9 widescreen format.

A magnified region 126 of a surface of photosensor array 106 shows the non-Bayer pixel tiling pattern of photosensor array 106, with a tiling pattern having two adjacent red pixels R, two adjacent blue pixels B, and four green pixels G organized as two pixel pairs. This tiling pattern has four pairs of adjacent pixels, where a first of the four pairs has two red-responsive pixels, a second of the four pairs comprises two blue-responsive pixels, and a third of the four pairs has two green-responsive pixels.

Other embodiments have alternative pixel tiling patterns, for example an alternative embodiment has a tiling pattern having two adjacent red pixels, two adjacent blue pixels, two adjacent green pixels, and two unfiltered white pixels organized as a pixel pair. In other alternative embodiments, a tiling pattern having sixteen pixels is used, again with pixels of at least three colors.

Figure 2:
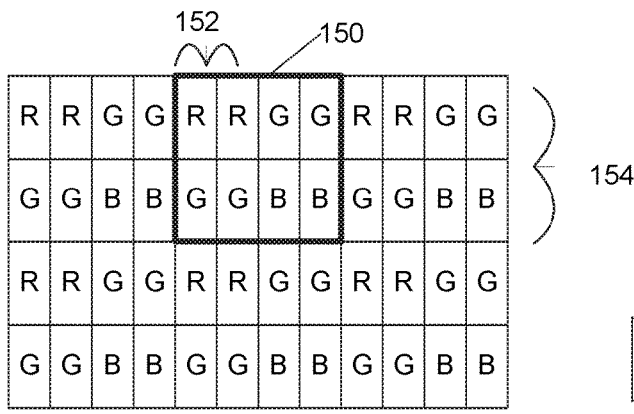
FIG. 2 is a representation of approximate pixel shapes and tiling pattern organization of the photosensor array of an embodiment.

In a particular embodiment, photosensor array 106 has a rectangular pixel shape that is narrower and taller than square—such that each rectangular pixel R, G, B illustrated in FIG. 2 roughly maps to a square region of scene 102 if projected through anamorphic lens 104. The tiling pattern 150 of photosensor array 106 has two adjacent red pixels R, two adjacent blue pixels B, and four green pixels G organized as two pixel pairs in opposite corners of the tiling pattern of eight pixels.

Figure 3:
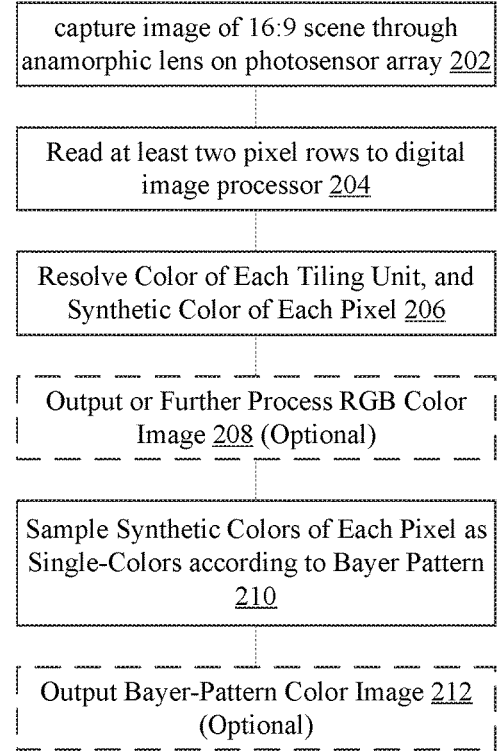
FIG. 3 is a flowchart of image capture and processing of a camera embodiment.

The camera system 100 operates by capturing 202 (FIG. 3) an image of the 16:9 scene 102 through anamorphic lens 104 on photosensor array 106. At least a portion including two or more rows of pixels, thus including all eight pixels of at least one row of tiling patterns 150 of photosensor array, is read 204 to the digital image processor 110. The two or more rows of pixels may in some embodiments be entire images, however two rows is sufficient if images are being processed while being streamed through digital image processor 110.

Digital image processor 110 then resolves 206 colors for each tiling pattern of the two or more rows. Once colors for each tiling pattern are resolved as tiling-pattern averaged red, green, and blue percentages, a synthetic red, green, and blue value is calculated for each individual pixel of the tiling pattern 150 in a manner similar to the way standard Bayer-pattern cameras known in the art calculate individual pixel colors.

In cameras adapted for RGB converted output 116, the synthetic red, green, and blue values are output 208 from the camera or subjected to further processing in image processor 110.

Figure 2A:
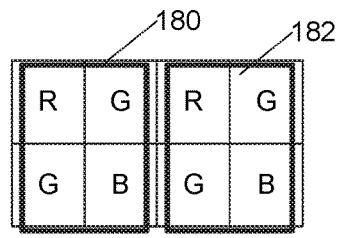
FIG. 2A is a representation of two adjacent Bayer-pattern tiling patterns.

In embodiments where the camera replaces a traditional lens and a Bayer-pattern traditional photosensor, and Bayer-pattern color resolution and processing is performed in a traditional image-processing system 120, the synthetic red, green, and blue values are sampled 210 according to the Bayer pattern and transmitted 212 as a Bayer-pattern image to optional traditional image-processing system 120 where, in a particular embodiment, color resolution is repeated, and image compression is performed. In these embodiments, photosensor information read from each 8-photosensor tiling unit of the photosensor 106 is transformed into synthetic photosensor information corresponding to two adjacent tiling units 180, 182 of Bayer-pattern photosensors as illustrated in FIG. 2A.

In some embodiments, three color filters overly the photosensor array 106, each color filter being a bandpass filter centered on one of three primary colors, red, green, and blue. Over each pair adjacent same-color photosensors of the tiling unit there is an opening in two of the three filters, allowing light to reach the photosensor through the remaining filter. For example, pair 152 (FIG. 2) of R photosensors are overlain by an opening in both the green and blue filters. The opening, however, is small enough that the left photosensor of the pair sees light admitted primarily by a right side of anamorphic lens 104, and the right photosensor of the pair sees light primarily admitted by a left side of anamorphic lens 104. This allows autofocus to operate by reading two or more rows 154 of photosensors to digital image processor 110, comparing relative intensities of the left and right photosensors in each pair 152, and adjusting focus motor 122 for an optimum.

Combinations

The features discussed herein may appear in various combinations in various combinations in embodiments. In particular, it is anticipated that the rectangular pixels, organization of pixels in pairs, the non-bayer pattern tiling units where color extraction is performed, colors assigned to each pixel of the tiling unit, and a synthetic readout provided according to a bayer pattern, and autofocus may be present in any combination. In particular, the following combinations are anticipated:

In an embodiment of a digital widescreen camera designated A, has an anamorphic lens configured to focus a wide aspect ratio field of view on a photosensor array having aspect ratio between 1.2:1 and 0.8:1. In a particular embodiment, the wide aspect ratio is a 16:9 aspect ratio.

A digital widescreen camera designated AA including the digital widescreen camera designated A wherein each pixel of each pixel pair is rectangular, and each pixel pair of the four pairs of pixels of each tiling unit is approximately square.

A digital widescreen camera designated AB including the digital widescreen camera designated A or AA wherein the photosensor array has an 8-pixel tiling unit including at least eight pixels, the 8 pixels comprising four pairs of adjacent left and right pixels, where a first of the four pairs includes two red-responsive pixels, a second of the four pairs includes two blue-responsive pixels, and a third of the four pairs includes two green-responsive pixels.

A digital widescreen camera designated AC including the digital widescreen camera designated A, AA, or AB further including a digital image processor configured to receive signals from at least one row of the eight-pixel tiling units, to extract color information from the signals from the eight pixels of at least one eight-pixel tiling unit, to generate synthetic color information for each of the eight pixels of the eight-pixel tiling unit, and to provide a remapped output wherein output signals mapped as two adjacent Bayer-pattern four-pixel tiling units correspond to synthetic color information of each of the at least one eight-pixel tiling units.

A digital widescreen camera designated AD including the digital widescreen camera designated A, AA, AB, or AC further including further comprising an autofocus motor adapted to adjust focus of the anamorphic lens, and wherein the digital image processor is configured to drive the autofocus motor to adjust the focus of the anamorphic lens to minimize differences between signals from the left and right pixels of each pair of pixels.

A digital widescreen camera designated AE including the digital widescreen camera designated A, AA, AB, AC, or AD wherein the photosensor array has an 8-pixel tiling unit comprising eight pixels, the 8 pixels comprising four pairs of adjacent left and right pixels, where a first of the four pairs comprises two red-responsive pixels, a second of the four pairs comprises two blue-responsive pixels, and a third of the four pairs comprises two green-responsive pixels.

A method designated B of generating a digital photograph including receiving light through an anamorphic lens onto a photosensor array, a field of view of the anamorphic lens being roughly twice as wide as it is tall, while the photosensor array is roughly square;

A method designated BA including the method designated B wherein the photosensor array has an eight-pixel tiling unit comprising eight pixels, the eight pixels comprising four pairs of adjacent left and right pixels, where a first of the four pairs comprises two red-responsive pixels, a second of the four pairs comprises two blue-responsive pixels, and a third of the four pairs comprises two green-responsive pixels.

A method designated BB including the method designated B or BA further including receiving signals from at least one row of the eight-pixel tiling units; extracting color information from the signals from the eight pixels of at least one eight-pixel tiling unit; generating synthetic color information for each of the eight pixels of the eight-pixel tiling unit; and providing a remapped output wherein signals corresponding to two adjacent Bayer-pattern four-pixel tiling units correspond to the synthetic color information of the eight-pixel tiling unit.

A method designated BC including the method designated B, BA, or BB wherein each pixel of each pixel pair is rectangular, and each pixel pair of the four pairs of pixels of each tiling unit is approximately square.

A method designated BD including the method designated B, BA, BB, or BC and further including driving an autofocus motor to adjust focus of the anamorphic lens to minimize differences between signals from the left and right pixels of each pair of pixels.

A method designate BE including the method designated BD, B, BA, BB, or BC wherein each pixel of each pixel pair is rectangular, and each pixel pair of the four pairs of pixels of each tiling unit is approximately square.

A method designated BF including the method designated B, BA, BB, BC, BD or BE wherein each pixel is rectangular, and the pixels are organized in pixel pairs that are approximately square; the pixel pairs organized in groups forming tiling units.

A method designated BG including the method designated BF and further including receiving signals from at least one row of the tiling units; extracting color information from the signals from the pixels of at least one tiling unit; generating synthetic color information for each of the pixels of the tiling unit; and providing a remapped output wherein signals corresponding to adjacent Bayer-pattern tiling units correspond to the synthetic color information of the tiling unit.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A digital widescreen camera comprising an anamorphic lens configured to focus a wide aspect ratio field of view having a 16:9 aspect ratio on a photosensor array having aspect ratio between 1.2:1 and 0.8:1, the 16 of the 16:9 aspect ratio in an X-axis and the 9 of the 16:9 aspect ratio in a Y axis of the field of view;
   the photosensor array having a plurality of pixels arranged in pixel pairs, wherein each pixel of each pixel pair is rectangular, and each pixel pair of the four pairs of pixels of each tiling unit is approximately square;
   wherein the photosensor array has an 8-pixel tiling unit comprising eight pixels, the 8 pixels comprising four pairs of adjacent left and right pixels, where a first of the four pairs comprises two red-responsive pixels, a second of the four pairs comprises two blue-responsive pixels, and a third of the four pairs comprises two green-responsive pixels;
   the digital widescreen camera further comprising a digital image processor configured to receive signals from at least one row of the eight-pixel tiling units, to extract color information from the signals from the eight pixels of at least one eight-pixel tiling unit, to generate synthetic color information for each of the eight pixels of the eight-pixel tiling unit, and to provide a remapped output wherein output signals mapped as two adjacent Bayer-pattern four-pixel tiling units correspond to synthetic color information of each of the at least one eight-pixel tiling units.

2. The digital widescreen camera of claim 1 further comprising an autofocus motor adapted to adjust focus of the anamorphic lens, and wherein the digital image processor is configured to drive the autofocus motor to adjust the focus of the anamorphic lens to minimize differences between signals from the left and right pixels of each pair of pixels.

3. The digital widescreen camera of claim 2 wherein the photosensor array has an 8-pixel tiling unit comprising eight pixels, the 8 pixels comprising four pairs of adjacent left and right pixels, where a first of the four pairs comprises two red-responsive pixels, a second of the four pairs comprises two blue-responsive pixels, and a third of the four pairs comprises two green-responsive pixels.

4. A method of generating a digital photograph comprising:
   receiving light through an anamorphic lens onto a photosensor array, a field of view of the anamorphic lens being approximately twice as wide as it is tall, while the photosensor array is approximately square;
   wherein the photosensor array has an eight-pixel tiling unit comprising eight pixels, the eight pixels comprising four pairs of adjacent left and right pixels, where a first of the four pairs comprises two red-responsive pixels, a second of the four pairs comprises two blue-responsive pixels, and a third of the four pairs comprises two green-responsive pixels;
   the method further comprising:
   receiving signals from at least one row of the eight-pixel tiling units;
   extracting color information from the signals from the eight pixels of at least one eight-pixel tiling unit;
   generating synthetic color information for each of the eight pixels of the eight-pixel tiling unit; and
   providing a remapped output wherein signals corresponding to two adjacent Bayer-pattern four-pixel tiling units correspond to the synthetic color information of the eight-pixel tiling unit.

5. The method of claim 4 wherein each pixel of each pixel pair is rectangular, and each pixel pair of the four pairs of pixels of each tiling unit is approximately square.

6. The method of claim 4 further comprising:
   driving an autofocus motor to adjust focus of the anamorphic lens to minimize differences between signals from the left and right pixels of each pair of pixels.

7. The method of claim 6 wherein each pixel of each pixel pair is rectangular, and each pixel pair of the four pairs of pixels of each tiling unit is approximately square.

8. The method of claim 4 wherein each pixel is rectangular, and the pixels are organized in pixel pairs that are approximately square; the pixel pairs organized in groups forming tiling units.

9. The method of claim 8 further comprising:
   receiving signals from at least one row of the tiling units;
   extracting color information from the signals from the pixels of at least one tiling unit;
   generating synthetic color information for each of the pixels of the tiling unit; and
   providing a remapped output wherein signals corresponding to adjacent Bayer-pattern tiling units correspond to the synthetic color information of the tiling unit.

10. The method of claim 9 wherein the tiling unit comprises eight pixels, the eight pixels organized as four pairs of adjacent left and right pixels, where a first of the four pairs comprises two red-responsive pixels, a second of the four pairs comprises two blue-responsive pixels, and a third of the four pairs comprises two green-responsive pixels.

* * * * *